No. 833,992. PATENTED OCT. 23, 1906.
A. WINTON & H. B. ANDERSON.
AIR BRAKE FOR AUTOMOBILES.
APPLICATION FILED AUG. 10, 1905.
3 SHEETS—SHEET 1.
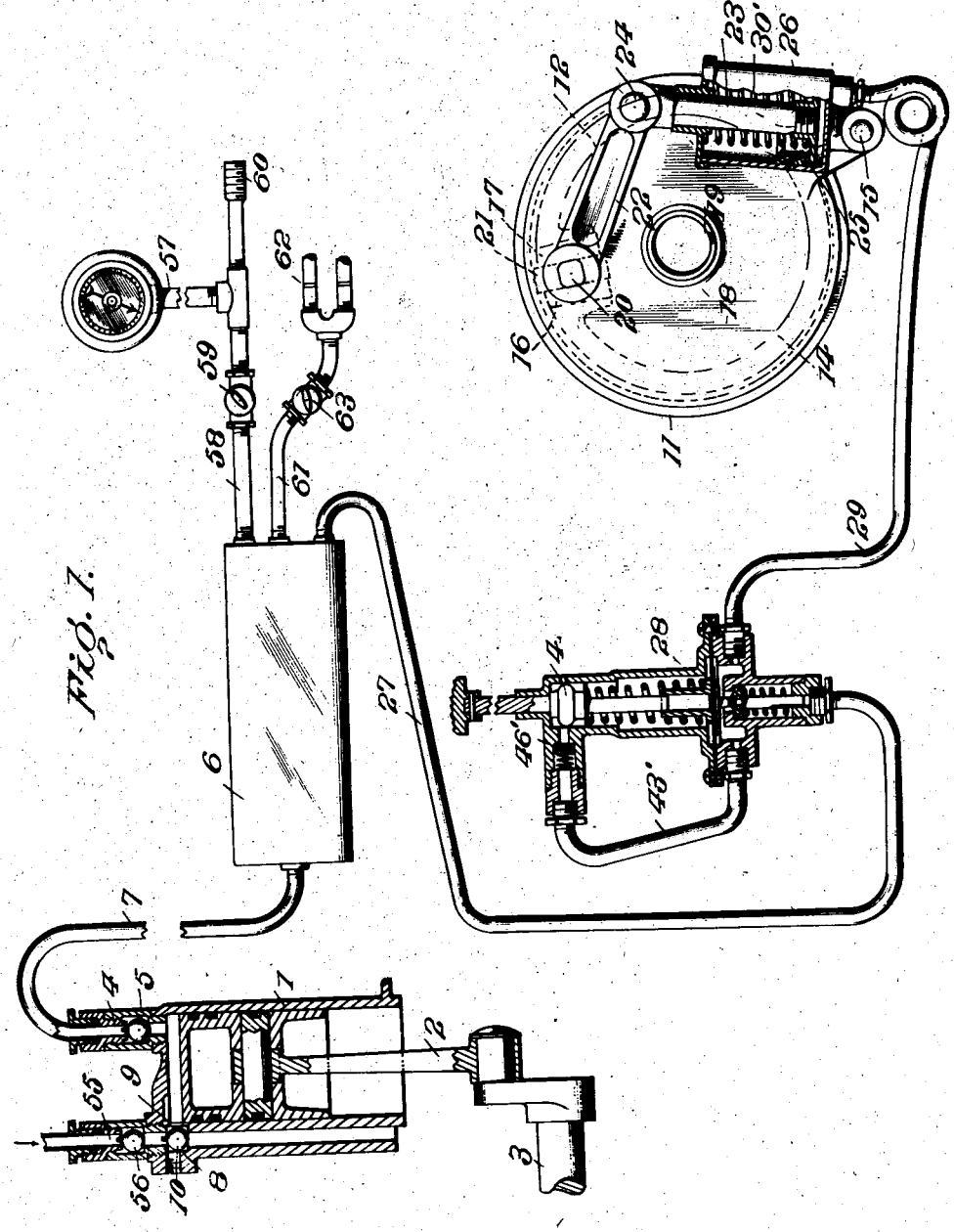

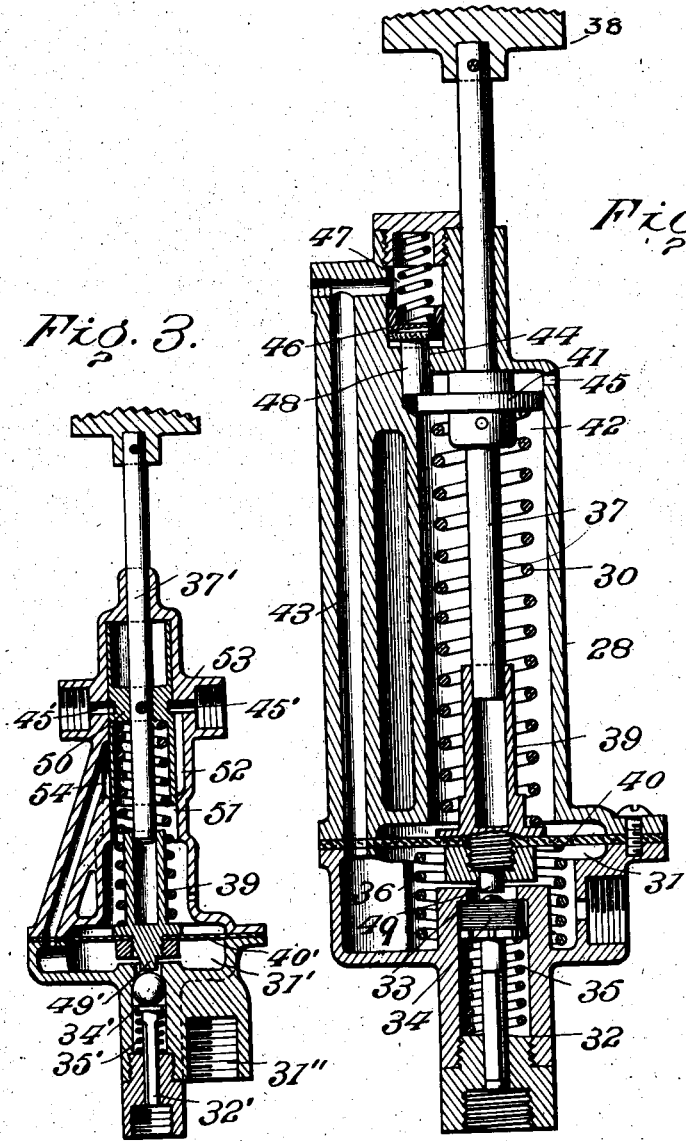

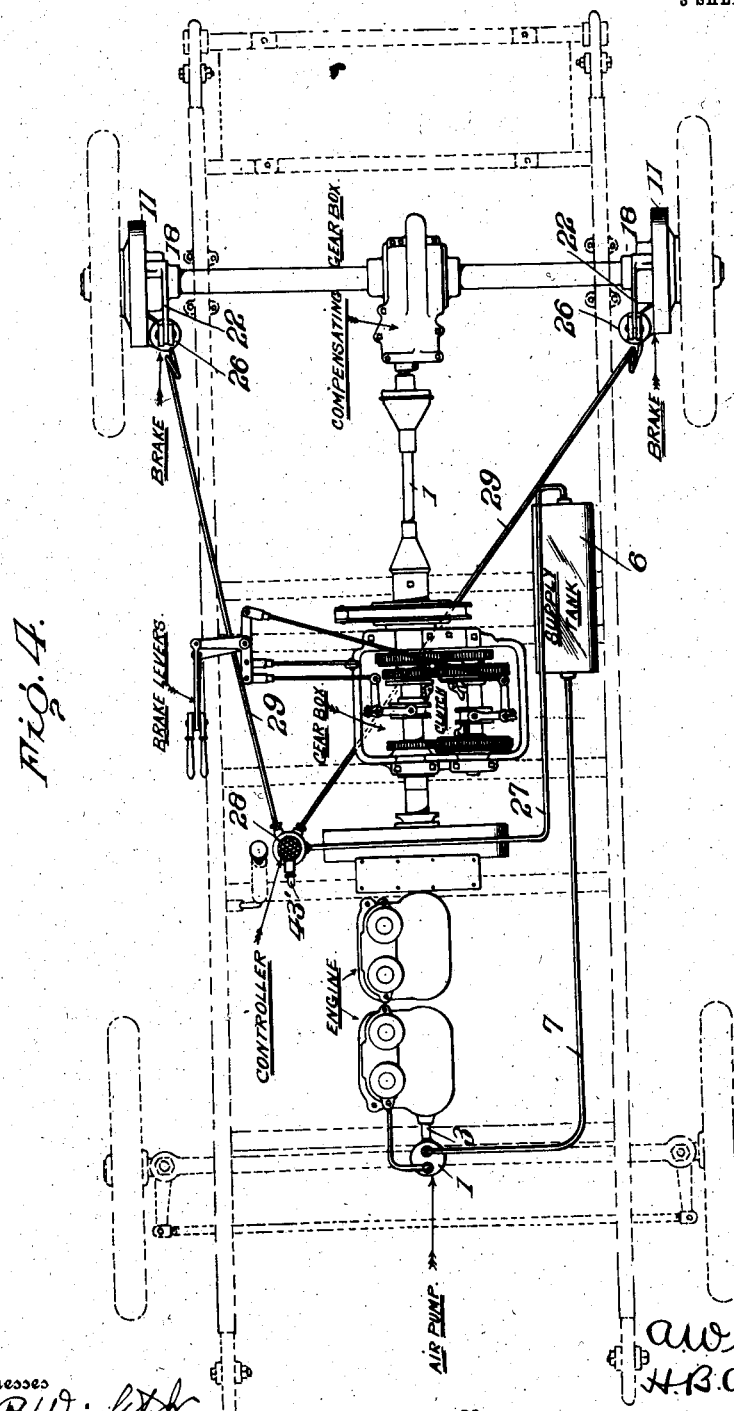

UNITED STATES PATENT OFFICE.

ALEXANDER WINTON AND HAROLD B. ANDERSON, OF CLEVELAND, OHIO; ASSIGNORS TO THE WINTON MOTOR CARRIAGE COMPANY, A CORPORATION OF OHIO.

AIR-BRAKE FOR AUTOMOBILES.

No. 833,992.

Specification of Letters Patent.

Patented Oct. 23, 1906.

Application filed August 10, 1905. Serial No. 273,631.

*To all whom it may concern:*

Be it known that we, ALEXANDER WINTON and HAROLD B. ANDERSON, citizens of the United States, residing at Cleveland, in the county of Cuyahoga and State of Ohio, have invented certain new and useful Improvements in Air-Brakes for Automobiles, of which the following is a specification, reference being had therein to the accompanying drawings.

This invention relates to improvement in air-brakes for automobiles, the object of which is to provide an air-braking mechanism for automobiles which is easily and conveniently controlled by the operator, and thus provide a brake which will avoid the usual physical exertion in manipulating the brakes now in use upon automobiles and which also places within the control of the operator a powerful brake to meet emergency cases, where a quick stop of the car is necessary to avoid accidents.

The object of the present invention also relates to a construction whereby the operator may place any desired air-pressure upon the brake from a slight pressure to the maximum and which will hold or set the brake at the desired pressure, the release of which is also within the control of the operator, the said functions or operations being accomplished by a single element, which may be either under the control of the foot or hand of the operator.

A brake having the above characteristics is adapted to be used in the place of the ordinary manually-operated brake, as it is as capable of the delicate pressure and with the advantage of high pressure at the will of the operator.

In the accompanying drawings, Figure 1 is a diagrammatic view of the air-brake involving the present invention, being partly shown in section. Fig. 2 is a detached enlarged longitudinal sectional view of the preferred form of controller. Fig. 3 is a view similar to Fig. 2, showing another form of controller. Fig. 4 is a diagrammatic view of the improved air-brake applied to an automobile and in connection with the disconnecting device.

Any desired air-pressure-producing device or mechanism may be used in carrying out the present invention. The preferred form, however, is a reciprocating air-pump 1, the pitman 2 of which is connected with a crank-shaft 3, which is operatively connected to the engine in any desired manner. The connection between the crank-shaft 3 and the engine is not here shown, as it is unnecessary to a full understanding of the present invention and forms no part thereof.

The air-pump has an outlet 4, controlled by a check-valve 5, and the outlet 4 communicates with a suitable storage-tank 6 by means of a pipe or passage-way 7. Air is admitted to the air-pump cylinder through the openings 8 and 9; the one 8 being controlled by a suitable check-valve 10 and closed thereby when the pump is compressing the air in its cylinder. The check-valve 5 is a single-acting valve and serves to close the outlet-passage against the passage of air into the cylinder from the tank 6.

A braking-flange 11 is carried by one of the vehicle-wheels, and located at the inner side of the braking-flange are the two members 12 and 14, having one of their ends pivotally supported at the point 15, and these two members serve to constitute a brake which coacts with or engages the inner side of the braking-flange 11 when their free ends 16 and 17 are separated. A disk 18 is suitably connected with the vehicle, being preferably supported by or connected with the rear axle-housing 19, and which is well understood by those skilled in the art. Suitably journaled in the disk 18 is an oscillating shaft 20, which carries at its inner end a crank-block or projection 21, which is located between the free ends 16 and 17 of the braking members 12 and 14. Connected to the projecting end of the oscillating shaft 20 is a crank-arm 22, and the outer end of this crank-arm is pivotally connected with the piston-rod 23 at the point 24. This piston-rod 23 is connected with a piston 25, which is located within the brake-operating cylinder 26, and the cylinder 26 is pivotally supported upon the pin 15, previously referred to, whereby the cylinder may oscillate when the crank-arm 22 is actuated by the outward movement of the piston 25 under the air-pressure within the cylinder 26.

Air-pressure to the cylinder 26 is supplied from the tank 6 through the pipe 27, controller 28, and pipe 29, the latter being connected to the cylinder 26 to supply air for actuating the piston 25 outward in said cylinder, the piston being normally held inward through the medium of a coiled spring 30'.

The controller 28 is an important feature of the present invention, the construction and operation of which will now be described. Referring first to the construction of this controller, and more particularly to the enlarged section, Fig. 2, it comprises a casing having a diaphragm-chamber 31 and an air-inlet opening 32, with which the pipe 27 from the tank 6 communicates. This opening 32 has at its upper end an opening 33, which communicates with the diaphragm-chamber 31, and the opening 33 is controlled by a check-valve 34, normally held against its seat by a spring 35, and thus normally closes the opening 33 against admission of air to the chamber 31 from the tank 6. A spring 36 is located below the diaphragm and serves to hold it in its normal horizontal position. Projecting into the casing of the controller is a manually-operated member or stem 37, having at its outer end a head 38, adapting it to be pressed by the foot of the operator. The lower end of this stem or member 37 is adapted to slide in a guideway 39, projecting upward from the diaphragm 40. The lower end of said coiled spring 30 rests upon the upper side of the diaphragm 40, and its upper end engages a collar 41, connected with the stem 37 within the bore 42 of the casing, which also contains the spring 30. This spring 30 serves to hold the stem or member 37 normally outward in the position indicated in Fig. 2 with the collar 41 abutting against the top wall of the bore 42. A passage-way 43 has its lower end communicating with the diaphragm-chamber 31 below the diaphragm and has its upper end communicating with the bore 42 through a valve-controlled opening 44. The casing is provided with an air-outlet passage 45, which is in communication with the said passage-way 44. A valve 46 serves to close the passage-way 44 when permitted to do so, and a spring 47 normally exerts a closing tension upon the said valve. The spring 30 is sufficiently strong to hold the stem or member 37 normally in its outward position, (shown in Fig. 2,) and the valve 46 has a stem 48 adapted to be engaged by the collar 41 when in the position shown in Fig. 2, so that the valve 46 is normally held open, and there is normally a free passage-way from the diaphragm-chamber 31 through the passage-ways 43 and 44 to the escape-opening 45, which will permit the air to escape from the diaphragm-chamber. Pipe 29 communicates with the diaphragm-chamber 31, and thus establishes communication between the said chamber and the cylinder 26.

While there is shown but one cylinder 26, it is to be understood that there will be a cylinder 26 and a coöperating braking mechanism for each of the rear driving-wheels of the vehicle and that there will be a communication between each of the braking-cylinders and the diaphragm-chamber 31.

Having thus described the construction of the controller, the operation thereof will now be explained. As here shown, the parts are in the positions for releasing the brake and the brake is not in operation. To apply the brake, the stem or member 37 is depressed, which permits the valve 46 to be seated. A further depression of the member 37 will exert sufficient tension upon the spring 30 to depress the diaphragm 40, and the depression of the diaphragm 40 will cause a projection or extension 49, carried by the diaphragm, to engage the valve 34 and unseat the valve. Air-pressure will then rush into the diaphragm-chamber 31 below the diaphragm from the tank 6 and through the pipe 29 to the cylinder or cylinders 26, thus actuating the pistons in the said cylinders and applying the brake members 12 and 14. As soon as the air-pressure in the diaphragm-chamber 31 is sufficient to equal the downward pressure exerted through the spring 30 upon the diaphragm 40 the latter will be forced upward by the said pressure and the valve 34 will be seated, thus holding in the cylinder 26 the desired pressure, according to the braking effect required. If a further pressure is desired in the cylinder 26, this is accomplished by depressing the member or stem 37 still farther, and thus exerting greater pressure through the spring upon the diaphragm, and again unseating the valve 34 until the required pressure on the brake is obtained. It will be understood that the more air-pressure there is under the diaphragm the greater pressure through the spring 30 is required to depress the diaphragm, and whatever pressure there is exerted upon the spring 30 will be equalized by the air-pressure under the diaphragm 40 and permit the closing of the valve 34 as long as the member or stem 37 is held depressed sufficiently to prevent its return to the normal position. (Shown in Fig. 2.) Assuming the brake to be set by the downward movement of the member 37, the brake may be instantly released by permitting the return of the member 37 to the position shown in Fig. 2, whereby the collar 41 will unseat the valve 46 and permit the air to escape from the diaphragm-chamber through the passages 43, 44, and 45, and hence release the pressure from the braking-cylinder 26 and permit the piston therein to be returned by its spring.

From the foregoing description it will be understood that if a slight pressure is desired upon the brake the loosening of the valve 34 from its seat by the downward pressure through the spring 30, as explained, will permit a small amount of air-pressure to enter the braking-cylinders, and when the air-pressure against the diaphragm equalizes the pressure exerted thereon by the spring 30 the valve 34 will close, and the valve 46 being closed, owing to the downward movement of the collar 41, the brake will be set at this slight pressure until released by the return of the member 37 and the unseating of the pressure relief or escape valve 46. A controller having a yielding operating means against which the air-pressure for operating the brake also acts enables any amount of pressure to be exerted upon the braking-cylinder between the minimum and the maximum pressure and without any waste of air-pressure—that is to say, if there were no means provided for closing automatically the communication between the air-supply tank and the braking-cylinder when the desired pressure was obtained there would be no way of locking the brake set at an intermediate pressure, because no matter how small a passsage-way is provided between the tank and the braking-cylinder if held open any length of time the pressure in the braking-cylinder would be equal to that in the supply-tank. The construction herein shown and desccribed, or its equivalent, provides means for operating the brake slightly or of operating the brake by a gradually-increasing pressure, or operating the brake by maximum pressure suddenly, and of locking the brake by the air-pressure at either of the above-mentioned pressures.

In Figs. 1 and 2 we have shown the preferred construction of controller, though we desire it to be understood that the construction there shown is not essential to the invention and that changes and modifications thereof may be made without departing from the spirit and scope of this invention, and many of these changes could be readily worked out by those skilled in this art from the disclosure herein.

The controller in Fig. 1 differs slightly from Fig. 2, in that the passage-way 43 of Fig. 1 consists of a separate pipe 43', and in that the collar 41' of Fig. 1 is constructed to have a cam action to open the relief-valve 46', and in that the relief-valve is differently situated.

In Fig. 3 is shown one of many modifications which might be made of the controller. In Fig. 3 the stem or member 37' is provided with a piston-relief 50, which moves in the casing 51. In this instance the passage-way 54 communicates with a chamber 52, and the piston 50 is provided with an annular groove 53. A spring 54' is located between the piston and the diaphragm 40' and acts similar to spring 30 in Figs. 1 and 2. The operation of this device is as follows: With the parts in the position shown in Fig. 3 air, pressure to the braking-cylinder is cut off, the air escape being through the passage 54 to the chamber 52 and thence out through the escape-opening 45'. The downward movement of the member 37' will close the escape-opening and unseat the check-valve 34', allowing pressure to flow from the supply-tank to the diaphragm-chamber 31' and through the passage-way 31'' to the braking cylinder or cylinders. The return of the member 37' to its normal position will open the escape-opening and release the air-pressure.

The air-producing pump 1 in addition to supplying air for the brake also supplies air for an air-controlling system for automobiles of the character described in United States patents granted to Alexander Winton, No. 582,108, dated May 4, 1897; No. 636,606, dated November 7, 1899, and No. 626,122, dated May 30, 1899. The air-supply for this air-governing system is through the passage-way 55, which is provided with a check-valve 56. By this arrangement an air-controlling system for antomobiles is provided which includes the propelling and the braking mechanisms.

Preferably a gage 57 is placed in the system, and a connection 58 between the tank 6 and the gage is provided. A valve 59 is located between the tank and the gage, and the connection 58 is provided with a connection-nozzle 60, adapted to receive a rubber tube for inflating the tires of the vehicle from the tank as may be desired, and the gage will indicate the pressure in the tire.

There may also be a connection 61 in the system for blowing what is known as the "Gabriel horn" or other signal 62, and this signal will be controlled by a valve 63, operated in any desired manner.

The braking system herein described is particularly intended to be used in motor-vehicles propelled by explosive-engines, or what are frequently termed "gasolene-motors," and in which it is designed to use a propelling mechanism between the explosive-motor and the driving shaft or wheels, and also a disconnecting device or clutch.

In Fig. 4 is shown the arrangement of a disconnecting device with the air-brake. The essential feature of the combination herein described for the air-brake, in connection with explosive-engines and its cooperating parts, is that there must be a disconnecting device and a propelling mechanism between the motor and the driven wheels, so that the motor can be detached from the driven wheels and continue to operate independently of them for the purpose of operating the pressure-producing device to supply the pressure for the air-brake when the engine is thrown out of gear with the propelling mechanism, whereby the brake can be used for controlling the movement of the vehicle when the motor is disconnected from the propelling-wheels, which is an essential feature of the present invention that accomplishes the practical application of the pressure-actuated brake to a motor-driven vehicle.

Having thus described our invention, what we claim, and desire to secure by Letters Patent, is—

1. An air-braking system in combination with a motor-vehicle having a driving-shaft and propelling-wheels attached thereto, a housing for the propelling-shaft, a propelling-wheel having a brake-flange, a braking member coöperating with the said flange, an air-cylinder supported by the housing and having a piston operatively connected with the brake member, an air-pressure supply for the cylinder, and a controller for the said air-pressure supply.

2. In combination with a motor-vehicle having a propelling-shaft and drive-wheels operatively connected therewith, the drive-wheels having a brake-flange, a housing for the driving-shaft, an oscillating cylinder supported by the housing, a brake member coöperating with the said flange, an oscillating member for operating the brake member, a piston in the cylinder operatively connected with the oscillating member, an air-supply for the said cylinder, and a controller for the said air-supply.

3. A controlling device for air-brake apparatus for motor-vehicles of the kind described comprising an air-admission valve, a diaphragm separate from the valve and having a part adapted to open said air-valve when the diaphragm is moved in one direction, a push-rod having a head whereby it can be operated by the foot of the driver or in like manner, a spring interposed between said rod and diaphragm, an air-passage leading to the brake-cylinders on the side of the diaphragm where the air-admission valve is situated, an outlet-passage connecting the space on the air-inlet side of the diaphragm with the atmosphere, a valve controlling said passage and opened by the rod when it is released, substantially as and for the purposes described.

In testimony whereof we affix our signatures in presence of two witnesses.

ALEXANDER WINTON.
HAROLD B. ANDERSON.

Witnesses:
M. ALEXANDER KENNEDY,
ORLAN F. BAUGHMAN.